US010571254B2

(12) United States Patent
Sanami

(10) Patent No.: US 10,571,254 B2
(45) Date of Patent: Feb. 25, 2020

(54) THREE-DIMENSIONAL SHAPE DATA AND TEXTURE INFORMATION GENERATING SYSTEM, IMAGING CONTROL PROGRAM, AND THREE-DIMENSIONAL SHAPE DATA AND TEXTURE INFORMATION GENERATING METHOD

(71) Applicant: Dai Nippon Printing Co., Ltd., Tokyo (JP)

(72) Inventor: Sho Sanami, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/077,873

(22) PCT Filed: Feb. 24, 2017

(86) PCT No.: PCT/JP2017/007054
§ 371 (c)(1),
(2) Date: Aug. 14, 2018

(87) PCT Pub. No.: WO2017/146202
PCT Pub. Date: Aug. 31, 2017

(65) Prior Publication Data
US 2019/0339067 A1    Nov. 7, 2019

(30) Foreign Application Priority Data

Feb. 25, 2016   (JP) .................... 2016-034458

(51) Int. Cl.
*G01B 11/24* (2006.01)
*H04N 5/232* (2006.01)
(Continued)

(52) U.S. Cl.
CPC ............... *G01B 11/24* (2013.01); *G06T 7/40* (2013.01); *G06T 7/55* (2017.01); *H04N 5/23299* (2018.08)

(58) Field of Classification Search
CPC .. G01B 11/24; G06T 7/55; G06T 7/40; H04N 5/23299
(Continued)

(56) References Cited

U.S. PATENT DOCUMENTS 8,848,201 B1   9/2014 Bruce et al.
2003/0175024 A1   9/2003 Miyoshi et al.
(Continued)

FOREIGN PATENT DOCUMENTS

JP   11-223516 A   8/1999
JP   2001-197521 A   7/2001
(Continued)

OTHER PUBLICATIONS

Wenzel Jakob et al., "Capturing Flair Assemblies Fiber by Fiber," ACM Transaction on Graphics, vol. 28, No. 5, Article 164, Dec. 2009, pp. 164.1-164.9. (cited in the Feb. 4, 2019 Search Report issued for EP17756636.1).
(Continued)

Primary Examiner — Allen C Wong
(74) Attorney, Agent, or Firm — Locke Lord LLP

(57) ABSTRACT

A three-dimensional shape data and texture information generating apparatus causes, in the state that a camera is focused on the partial region comprising the distance measurement target point on an object, causes a distance measuring sensor to measure the distance from the position of the camera to the distance measurement target point, causes a driving apparatus to drive at least one of the object and the camera so that the partial regions are sequentially changed while one of the measured distance and a distance calculated from the measured distance is kept within a range of a depth of field, acquires an image of each partial region by causing the camera to capture the image of each of the partial regions on the object, and generates the three-dimensional shape data and texture information based on the obtained image.

20 Claims, 5 Drawing Sheets

(51) Int. Cl.
*G06T 7/55* (2017.01)
*G06T 7/40* (2017.01)

(58) Field of Classification Search
USPC .......................................................... 348/142
See application file for complete search history.

(56) References Cited

U.S. PATENT DOCUMENTS

2009/0051682 A1* 2/2009 Lonsing .................. G06T 15/00
                                                                345/419
2014/0369571 A1* 12/2014 Tsukizawa ......... G06K 9/00248
                                                                382/118

FOREIGN PATENT DOCUMENTS

| JP | 2001-338279 A | 12/2001 |
| JP | 2003-148926 A | 5/2003 |
| JP | 2003-269932 A | 9/2003 |
| JP | 2006-162250 A | 6/2006 |
| JP | 2007-304429 A | 11/2007 |
| JP | 2012-098265 A | 5/2012 |
| JP | 2012-154862 A | 8/2012 |
| JP | 2014-055810 A | 3/2014 |

OTHER PUBLICATIONS

International Search Report dated May 9, 2017, issued for PCT/JP2017/007054.

* cited by examiner

THREE-DIMENSIONAL SHAPE DATA AND TEXTURE INFORMATION GENERATING SYSTEM, IMAGING CONTROL PROGRAM, AND THREE-DIMENSIONAL SHAPE DATA AND TEXTURE INFORMATION GENERATING METHOD

TECHNICAL FIELD

The present invention relates to a technical field of a system and the like for acquiring the three-dimensional shape of an object and texture information about the object.

BACKGROUND ART

Various tools for acquiring the three-dimensional shapes of objects have been suggested, but the functions of all the tools are limited to those under certain conditions. In conventional cases, operators adjust imaging environments and methods so that the conditions are satisfied. However, it is not possible to control positions and orientations with high accuracy. Therefore, a computation time might become longer due to a process of combining acquired data, and the accuracy of the results of positioning might be low. It is also difficult to eliminate blurring, noise, and the like caused by the imaging conditions from digitized data, and this difficulty leads to a longer data preparation process. Further, in digital data of the object that shows both the three-dimensional shape of the object and the pattern on the surface of the shape, the texture information showing the pattern on the surface is often data with higher definition than the shape information, and there is a demand for capturing more precise images.

Meanwhile, Patent Literature 1 discloses a portable three-dimensional shape measuring apparatus that can be carried around and enables quick acquisition of high-precision three-dimensional shape data. In this portable three-dimensional shape measuring apparatus, a three-dimensional shape sensor capable of detecting a three-dimensional shape is attached as a shape sensor to the tip of an articulated arm standing on a base, and the three-dimensional shape sensor is made to face a measurement region on a measurement target in a non-contact manner, with the three-dimensional position and the posture thereof being adjusted. While the three-dimensional shape sensor is in a resting state, three-dimensional shape data of the measurement target is output from the shape sensor as a result of surface scanning. Patent Literature 2 discloses a method of generating three-dimensional shape data from a plurality of images. According to this method, the position and the orientation of the camera that has captured the images can be calculated, and thus, a three-dimensional shape that is not affected by the accuracy of the position and the orientation of the camera can be generated. In Patent Literature 3, imaging is performed with a single camera under various lighting conditions, and the three-dimensional shape of an object and texture information about the object are generated. As a single camera is used, positional displacement between the three-dimensional shape and the texture due to distortion of the lens is avoided.

CITATION LIST

Patent Literatures

Patent Literature 1: JP 2003-148926 A
Patent Literature 2: JP 2001-338279 A
Patent Literature 3: JP 2014-55810 A

SUMMARY OF INVENTION

Problem to be Solved by the Invention

However, the three-dimensional shape sensor disclosed in Patent Literature 1 effectively functions in a predetermined distance range, and data outside the distance range cannot be acquired or results in an error. Therefore, it is necessary for the operator to move the three-dimensional shape sensor to a position where no errors will occur. If the position of the three-dimensional shape sensor with respect to the three-dimensional shape can be accurately determined, it is possible to increase the accuracy of the acquired three-dimensional shape. However, the accuracy of the position and the orientation cannot be increased with the joint angle of an articulated arm, an external marker, or the like. On the other hand, a three-dimensional shape generated by the method according to Patent Literature 2 depends on the resolution of the camera. Therefore, a high-resolution camera needs to be used in generating high-definition three-dimensional shape data and texture information, and closeup imaging needs to be performed. In that case, the focal range is extremely narrow, and therefore, an autofocus mechanism is also used to prevent blurring of images. However, this causes a change in the imaging system model that defines the optical system of an imaging means, and lowers the accuracy of generation of high-definition three-dimensional shape data and texture information. For this reason, the method according to Patent Literature 2 has not been put into practical use. Further, in a case where the position of texture information and the position of a three-dimensional shape are adjusted to each other by the method according to Patent Literature 3, a texture image shows correct texture when viewed from the imaging direction, but the texture is not set at correct positions when viewed from other directions. This is because the information about the three-dimensional shape and the color information about the texture are independent of each other. Therefore, the problem cannot be solved, as long as the method of generating a three-dimensional shape and the method of generating texture differ from each other.

Therefore, the present invention aims to provide a three-dimensional shape data and texture information generating system, an imaging control program, and a three-dimensional shape data and texture information generating method that can reduce appearance of blurring and generation of noise due to the conditions for imaging an object, and obtain high-definition three-dimensional shape data and texture information.

Means for Solving the Problem

For solving the above problem, the invention described in claim 1 is characterized in that a three-dimensional shape data and texture information generating system comprises: an imaging means that captures an image of each partial region on an object; a distance measuring means that measures a distance from a position of the imaging means to a distance measurement target point; a driving means that drives at least one of the object and the imaging means; a control means that controls the imaging means, the distance measuring means, and the driving means; and a generating means that generates three-dimensional shape data of and texture information about the object in accordance with the image of each partial region captured by the imaging means, wherein the control means causes, in the state that the imaging means is focused on the partial region comprising the distance measurement target point on the object, the distance measuring means to measure the distance from the position of the imaging means to the distance measurement target point, causes the driving means to drive at least one of the object and the imaging means so that the partial regions are sequentially changed while one of the measured distance and a distance calculated from the measured distance is kept within a range of a depth of field, and acquires an image of each partial region by causing the imaging means to capture the image of each of the partial regions on the object.

The invention described in claim 2 is characterized in the three-dimensional shape data and texture information generating system according to claim 1, wherein, while keeping the distance within the range of the depth of field, the control means causes the driving means to drive at least one of the object and the imaging means so that the partial region to be changed and a partial region adjacent to the partial region to be changed overlap each other.

The invention described in claim 3 is characterized in the three-dimensional shape data and texture information generating system according to claim 2, wherein the control means causes the driving means to drive at least one of the object and the imaging means so that the same portion of the object is imaged a plurality of times.

The invention described in claim 4 is characterized in the three-dimensional shape data and texture information generating system according to any one of claims 1 to 3, wherein the driving means includes a turntable on which the object is placed, and the control means drives the turntable so that the partial regions are sequentially changed.

The invention described in claim 5 is characterized in the three-dimensional shape data and texture information generating system according to any one of claims 1 to 4, wherein the imaging means and the distance measuring means are attached to a slider capable of changing a distance from the distance measurement target point, and the control means drives the slider so that the measured distance is kept within the range of the depth of field.

The invention described in claim 6 is characterized in the three-dimensional shape data and texture information generating system according to any one of claims 1 to 3, wherein the imaging means and the distance measuring means are attached to a robot arm capable of changing at least one of a position and a posture of each of the imaging means and the distance measuring means with respect to the distance measurement target point, and the control means drives the robot arm so that the partial regions are sequentially changed while one of the measured distance and the distance calculated from the measured distance is kept within the range of the depth of field.

The invention described in claim 7 is characterized in the three-dimensional shape data and texture information generating system according to any one of claims 1 to 6, wherein a lens of the imaging means is a macro lens.

The invention described in claim 8 is characterized in that a three-dimensional shape data and texture information generating system comprises: a camera that captures an image of each partial region on an object; a distance measuring sensor that measures a distance from a position of the camera to a distance measurement target point; a driving device that drives at least one of the object and the camera; and a controller that controls the camera, the distance measuring sensor, and the driving device, wherein the controller causes, in the state that the camera is focused on the partial region comprising the distance measurement target point on the object, the distance measuring sensor to measure the distance from the position of the camera to the distance measurement target point, causes the driving device to drive at least one of the object and the camera so that the partial regions are sequentially changed while one of the measured distance and a distance calculated from the measured distance is kept within a range of a depth of field, and causes the camera to capture an image of each partial region on the object, and the three-dimensional shape data and texture information generating system further comprises a processor that performs a generating process to generate three-dimensional shape data of and texture information about the object in accordance with the image of each partial region captured by the camera.

The invention described in claim 9 is characterized in that an imaging control program to be executed by a computer included in a control means in a three-dimensional shape data and texture information generating system that includes: an imaging means that captures an image of each partial region on an object; a distance measuring means that measures a distance from a position of the imaging means to a distance measurement target point; a driving means that drives at least one of the object and the imaging means; a control means that controls the imaging means, the distance measuring means, and the driving means; and a generating means that generates three-dimensional shape data of and texture information about the object in accordance with the image of each partial region captured by the imaging means, the imaging control program causes the computer to carry out: a step of causing, in the state that the imaging means is focused on the partial region comprising the distance measurement target point on the object, the distance measuring means to measure the distance from the position of the imaging means to the distance measurement target point; a step of causing the driving means to drive at least one of the object and the imaging means so that the partial regions are sequentially changed while one of the measured distance and a distance calculated from the measured distance is kept within a range of a depth of field; and a step of acquiring an image of each partial region by causing the imaging means to capture the image of each of the partial regions on the object.

The invention described in claim 10 is characterized in a three-dimensional shape data and texture information generating method comprises: a step of causing, in the state that a camera is focused on a partial region comprising a distance measurement target point on an object, a distance measuring sensor to measure a distance from a position of the camera to the distance measurement target point on the object; a step of causing a driving device to drive at least one of the object and the camera so that partial regions are sequentially changed while one of the measured distance and a distance calculated from the measured distance is kept within a range of a depth of field; a step of causing the camera to capture an image of each partial region on the object in a process in which the partial regions are sequentially changed; and a step of causing a processor to generate three-dimensional shape data of and texture information about the object in accordance with the image of each partial region captured by the camera.

Effects of Invention

According to the present invention, appearance of blurring and generation of noise due to the conditions for imaging an object can be reduced, and high-definition three-dimensional shape data and texture information can be obtained. As three-dimensional shape data and texture information are simultaneously generated from images captured by a single imaging device, the three-dimensional shape data and the texture information can be generated, with the positions of the three-dimensional shape and the texture information coinciding with each other.

DESCRIPTION OF EMBODIMENT

The following is a description of an embodiment of the present invention, with reference to the drawings.

[1. Configuration and Functions of a Three-Dimensional Shape Data and Texture Information Generating System S]

Figure 1:
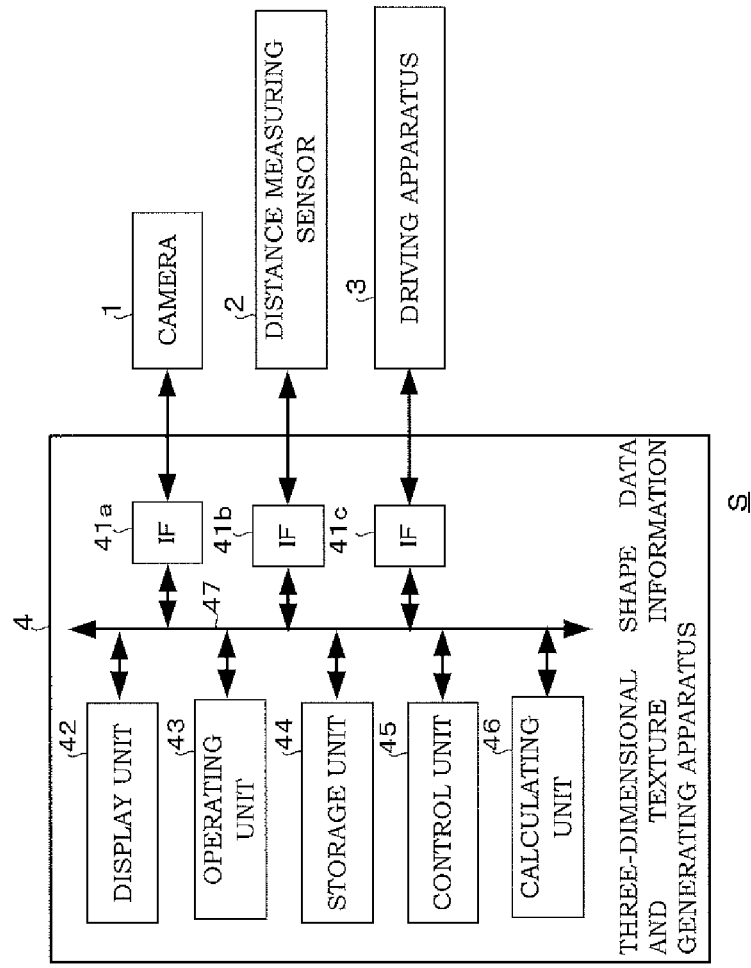
FIG. 1 is a block diagram showing a schematic configuration of a three-dimensional shape data and texture information generating system S according to this embodiment.

Referring first to FIG. 1 and other figures, the configuration and the functions of a three-dimensional shape data and texture information generating system S according to this embodiment are described. FIG. 1 is a block diagram showing a schematic configuration of the three-dimensional shape data and texture information generating system S according to this embodiment. As shown in FIG. 1, the three-dimensional shape data and texture information generating system S comprises a camera 1, a distance measuring sensor 2, a driving apparatus 3, and a three-dimensional shape data and texture information generating apparatus 4 or the like. The camera 1 is an example of an imaging means according to the present invention, the distance measuring sensor 2 is an example of a distance measuring means according to the present invention, and the driving apparatus 3 is an example of a driving means according to the present invention. The camera 1 and the distance measuring sensor 2 are used as sensors for acquiring the three-dimensional shape of an object (the object to be imaged). In a case where it is necessary to accurately acquire the three-dimensional shape of an object and the texture of the pattern or the like drawn on the object, for example, the three-dimensional shape data and texture information generating system S according to this embodiment is used for detecting the three-dimensional shape prior to the processing and checking the operation after the processing in an industrial robot, or obtaining the specific shape and the texture in the digitization process for an artwork.

The camera 1 includes a macro lens, a shutter, and an imaging element (an image sensor). Under the control of the three-dimensional shape data and texture information generating apparatus 4, the camera 1 captures images of the respective partial regions of the object, and outputs the captured images to the three-dimensional shape data and texture information generating apparatus 4. A single-lens reflex camera is used as the camera 1. The macro lens is a single focus lens whose focal length (the distance from the center of the optical lens to the focal point) does not change, and its focal range is very narrow (the depth of field is several mm where the aperture value is about F5.6, for example). The macro lens is a lens for capturing images in a narrow range with high magnification. Strictly speaking, the focal range exists only on one plane in theory. However, there is an allowable range of a predetermined length (which is a depth of field) forward or backward in the depth direction from the plane, and this allowable range can be regarded as the focal range. Focusing is performed on an image captured from the macro lens into the three-dimensional shape data and texture information generating apparatus 4, or on an image checked through the finder of the camera 1. In this embodiment, the camera 1 not having any autofocus mechanism is used. Even in a case where the camera 1 has an autofocus mechanism, the autofocus mechanism is not used.

The distance measuring sensor 2 includes a light source (such as a light-emitting diode or a laser diode) and a light receiving element or the like. Under the control of the three-dimensional shape data and texture information generating apparatus 4, the distance measuring sensor 2 measures the distance from the position of the camera 1 (the position of the camera 1 in the real space) to a distance measurement target point (corresponding to the center of the pixel of a partial region) on the object, and outputs the measured distance to the three-dimensional shape data and texture information generating apparatus 4. The position of the camera 1 is on the optical axis extending through the center of the lens of the camera 1, and is the focal point of the lens, for example. In a case where the position of the camera 1 coincides with the position of the distance measuring sensor 2, the distance measured by the distance measuring sensor 2 can be used as it is. However, in a case where the position of the camera 1 and the position of the distance measuring sensor 2 do not coincide with each other, the distance measured by the distance measuring sensor 2 is corrected by the three-dimensional shape data and texture information generating apparatus 4 so as to be equal to the distance from the position of the camera 1 in accordance with the known principles of triangulation. The distance measuring sensor 2 may be provided integrally with the camera 1 inside the housing of the camera 1. Since the focal range is a predetermined length forward or backward in the depth direction, the offset can be calculated and corrected so that the focal range becomes wider, with the shape of the object being taken into consideration.

The driving apparatus 3 includes a drive mechanism that drives the object and/or the camera 1 (or drives the object and/or the camera 1 with power) and a control circuit that controls the drive mechanism, under the control of the three-dimensional shape data and texture information generating apparatus 4. Here, the drive mechanism comprises a turntable on which the object is placed, and a slider to which the camera 1 and the distance measuring sensor 2 are attached. Alternatively, the drive mechanism comprises an articulated robot arm to which the camera 1 and the distance measuring sensor 2 are attached.

The three-dimensional shape data and texture information generating apparatus 4 comprises interface units 41a through 41c, a display unit 42, an operating unit 43, a storage unit 44, a control unit (a controller) 45, and a calculating unit 46 or the like, and these components are connected to one another via a bus 47. The interface unit 41a serves as an interface for the control unit 45 to communicate with the camera 1 in a wired or wireless manner. The interface unit 41b serves as an interface for the control unit 45 to communicate with the distance measuring sensor 2 in a wired or wireless manner. The interface unit 41c serves as an interface for the control unit 45 to perform communication with the driving apparatus 3 in a wired or wireless manner. The display unit 42 has a display screen for displaying various kinds of information. The display screen displays an image (a two-dimensional image) of each partial region on the object captured by the camera 1, a three-dimensional image or the like showing the three-dimensional shape of the entire object, and the distance between the object and the camera 1. The operating unit 43 receives an operation instruction from the user, and outputs a signal corresponding to the received operation instruction to the control unit 45. For example, a mouse is used as the operating unit 43. Alternatively, the display unit 42 and the operating unit 43 may be formed with a touch panel having a display function of displaying various kinds of information on its display screen, and an input function of receiving an operation that is input with a human finger or a pen or the like.

The storage unit 44 is a hard disk drive or a nonvolatile semiconductor memory, for example, and stores an operating system (OS), an imaging control program, a three-dimensional shape generating program, various kinds of setting data, and the like. The storage unit 44 also stores data of captured images of the respective partial regions of the object, and three-dimensional shape data and texture information generated in accordance with the images of the respective partial regions. This three-dimensional shape data and the texture information are data that forms a three-dimensional image showing the three-dimensional shape of and/or the texture information about the entire or part of the object.

The control unit 45 comprises a central processing unit (CPU), a read only memory (ROM), and a random access memory (RAM). In accordance with the imaging control program stored in the storage unit 44, the control unit 45 performs an imaging control process on the object. In this imaging control process, the control unit 45 functions as a control means that controls the camera 1, the distance measuring sensor 2, and the driving apparatus 3. Specifically, the control unit 45 causes the distance measuring sensor 2 to measure the distance from the position of the camera 1 to a distance measurement target point, while the camera 1 is focused on the partial region including the distance measurement target point on the object. The control unit 45 then causes the driving apparatus 3 to drive the object and/or the camera 1 to sequentially change the partial regions while maintaining the measured distance or the distance calculated from the measured distance at a constant value (constant with respect to a depth of field of several mm), and acquires images of the respective partial regions of the object by causing the camera 1 to capture the images of the respective partial regions. That is, while maintaining the distance between the object and the camera 1 at a constant value (constant with respect to the depth of field of several mm), the control unit 45 moves the object and/or the camera 1 several cm at a time in a predetermined direction. The control unit 45 also drives the object and/or the camera 1 (by supplying a drive-ON signal to the driving apparatus 3) so that the partial region to be changed and a partial region adjacent to the partial region to be changed overlap with each other. During this drive control process (or the process of sequentially changing the partial regions), the control unit 45 causes the camera 1 to capture images of the respective partial regions (by supplying a shutter-ON signal to the camera 1). Thus, the control unit 45 acquires the images of the respective partial regions from the camera 1. As a result, one portion of the object is imaged at least twice, and the one portion of the object can be imaged from different imaging positions relatively. According to photogrammetry from the images acquired from the relatively different imaging positions, the three-dimensional position of the one portion can be identified. Furthermore, an image of the entire circumference of the shape of the object in focus can be acquired with the use of parameters subjected to lens calibration, for example.

The calculating unit 46 comprises a CPU, a ROM, and a RAM. According to the three-dimensional shape and texture information generating program stored in the storage unit 44, the calculating unit 46 performs a three-dimensional shape data and texture information generating process to generate three-dimensional shape data of and texture information about the object. In the three-dimensional shape data and texture information generating process, the calculating unit 46 functions as a generating means that generates the three-dimensional shape data of and the texture information about the object in accordance with the images (two-dimensional images) of the respective partial regions captured by the camera 1. In a case where a two-dimensional image is acquired with the camera 1 imaging the object in a three-dimensional space, the coordinates (X, Y, Z) in the three-dimensional space are transformed into the coordinates (u, v) in the two-dimensional image, according to the following expression (1) obtained from the product of a matrix $M_{outer}$ representing the position and the posture of the camera and a matrix $M_{inner}$ representing the optical transform in the camera 1:

[Mathematical Formula 1]

$$\begin{bmatrix} u \\ v \\ 1 \end{bmatrix} = M_{inner} \cdot M_{outer} \cdot \begin{bmatrix} X \\ Y \\ Z \\ 1 \end{bmatrix} = \begin{bmatrix} a_{11} & a_{12} & a_{13} \\ a_{21} & a_{22} & a_{23} \\ a_{31} & a_{32} & a_{33} \end{bmatrix} \cdot \begin{bmatrix} r_{11} & r_{12} & r_{13} & t_x \\ r_{21} & r_{22} & r_{23} & t_y \\ r_{31} & r_{32} & r_{33} & t_z \end{bmatrix} \cdot \begin{bmatrix} X \\ Y \\ Z \\ 1 \end{bmatrix} \quad (1)$$

Where a sufficient number of sets of coordinates (X, Y, Z) in the three-dimensional space and the corresponding coordinates (u, v) in the two-dimensional image are assigned to this expression, the calculating unit 46 can calculate the matrix $M_{outer}$ and the matrix $M_{inner}$. After calculating the matrix $M_{outer}$ and the matrix Manner, the calculating unit 46 can calculate the coordinates (X, Y, Z) in the three-dimensional space from the coordinates (u, v) in the two-dimensional image, and thus, generate three-dimensional shape data and texture information from the two-dimensional image. Such a method has been suggested in literatures such as "Automated Pavement Distress Survey through Stereovision" (prepared by Kelvin C. P. Wang, University of Arkansas, Fayetteville, Ark.), for example. Since the matrix $M_{outer}$ representing the position and the posture of the camera 1 can be calculated from sets of coordinates (X, Y, Z) in the three-dimensional space and coordinates (u, v) in the two-dimensional image, the necessary sets of coordinates for calculating the matrix $M_{outer}$ can be obtained from an image containing sufficiently characteristic coordinates. Meanwhile, to obtain the matrix $M_{inner}$ representing the optical transform in the camera 1, a calibration pattern including known coordinates (X, Y, Z) in the three-dimensional space is usually imaged, and the matrix $M_{inner}$ is usually calculated on the basis of the assumption that the matrix $M_{inner}$ is constant. However, the matrix $M_{inner}$ is affected by the focus position adjustment conducted by the autofocus mechanism of the camera 1, and becomes an obstacle in restoring the coordinates (X, Y, Z) in the three-dimensional space with high accuracy. In the present invention, to achieve an imaging environment in which the matrix $M_{inner}$ is completely constant, the operation to focus on the object is performed with the positional elements $(t_x, t_y, t_z)$ of the matrix $M_{outer}$, instead of the matrix $M_{inner}$. As a result, the matrix $M_{inner}$, which has been calibrated or calculated with high accuracy, can be used in calculating the coordinates (X, Y, Z) in the three-dimensional space without a decrease in accuracy.

It should be noted that the three-dimensional shape data and texture information generating apparatus 4 may be divided into personal computers (PCs). In a first example, data stored in the hard disk in an imaging PC is referred to and calculated by another PC connected to the network, and three-dimensional shape data and texture information are generated. In a second example, images are stored in an external hard disk attached to an imaging PC, and the external hard disk is then connected to another PC. Calculation is then performed, and three-dimensional shape data and texture information are generated. In a third example, the camera and the object are operated with a controlling PC. When the shooting button of the camera is pressed, an imaging PC receives image data from the camera, and stores the image data (the imaging performed by the camera is detected from a strobe signal of the camera).

[2. Operation of the Three-Dimensional Shape Data and Texture Information Generating System S]

Next, operation of the three-dimensional shape data and texture information generating system S according to this embodiment will be described as Example 1 and Example 2.

EXAMPLE 1

Figure 2:
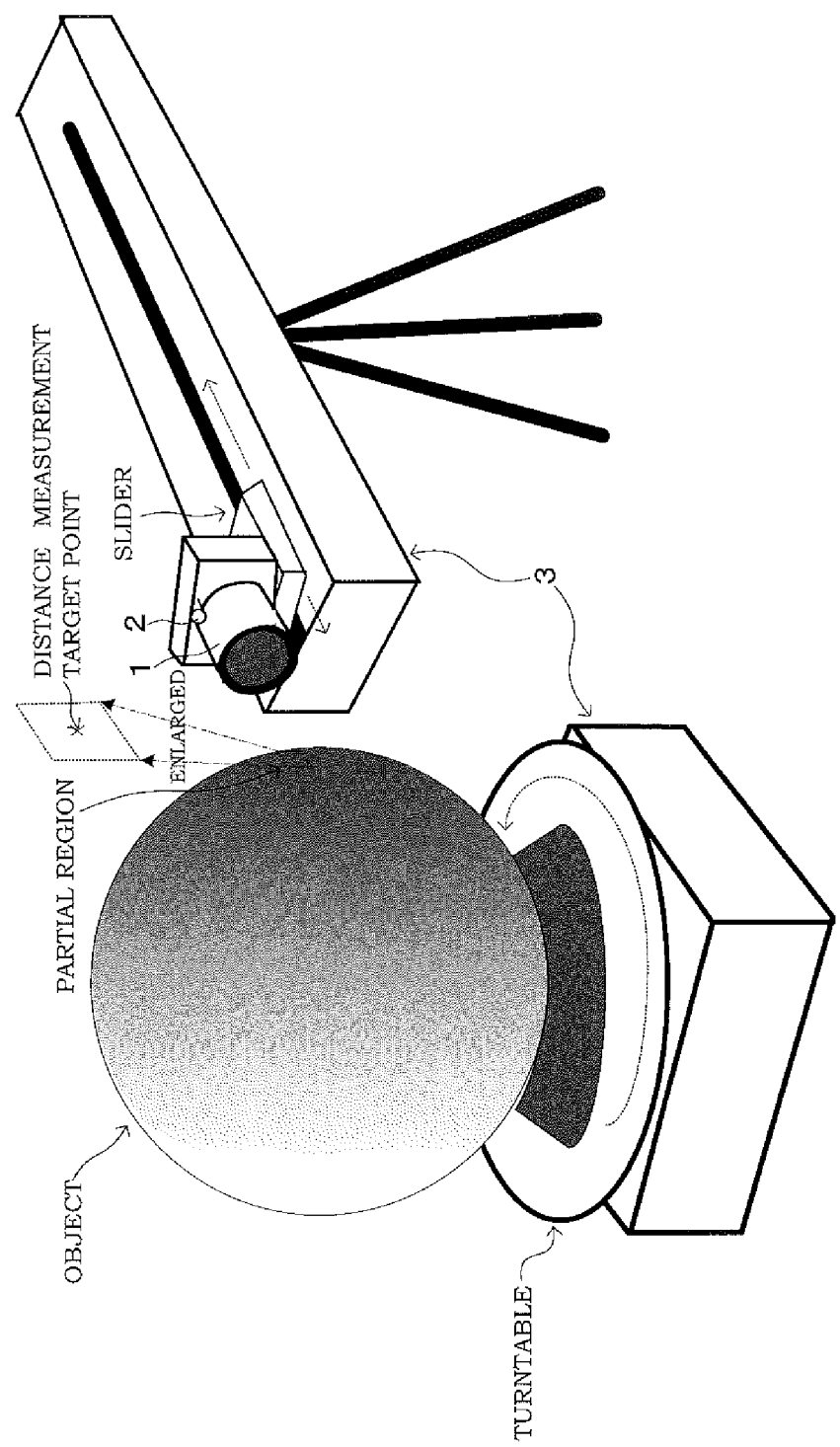
FIG. 2 is a figure showing an example of the positional relationship among an object (a globe, for example) placed on a turntable, a camera 1, and a distance measuring sensor 2 in Example 1.
Figure 3:
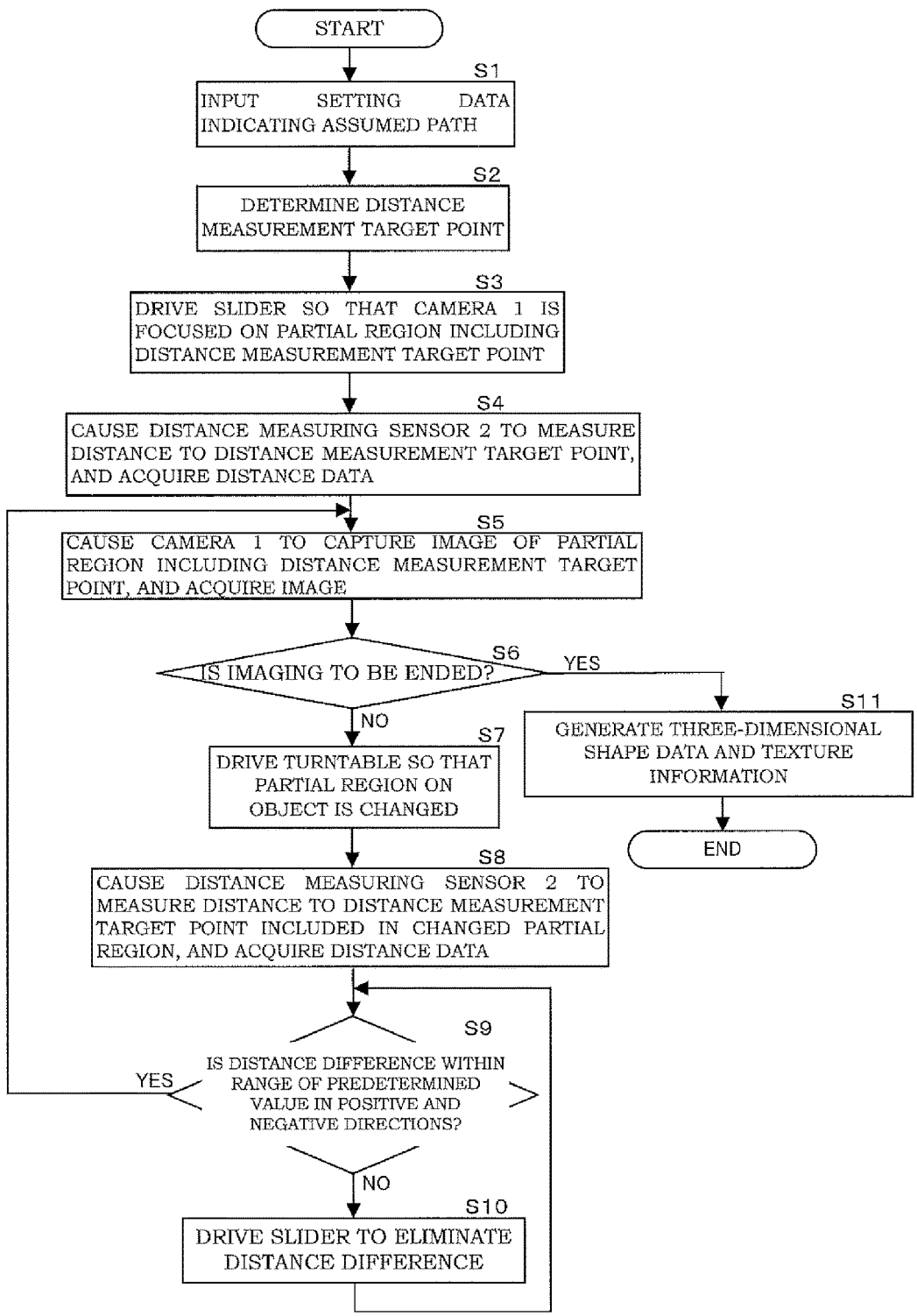
FIG. 3 is a flowchart showing an example of an imaging control process and a three-dimensional shape data and texture information generating process in Example 1.

Referring first to FIGS. 2 and 3, Example 1 is described. FIG. 2 is a figure showing an example of the positional relationship among an object (a globe, for example) placed on a turntable, the camera 1, and the distance measuring sensor 2 in Example 1. As shown in FIG. 2, under the control of the control unit 45, the turntable rotates about the central axis (in the direction indicated by a dashed arrow in FIG. 2). The camera 1 and the distance measuring sensor 2 are attached to a slider. Under the control of the control unit 45, the slider is provided so that the distance from a distance measurement target point on the object can be changed, and the slider moves forward and backward (in the directions indicated by dashed arrows in FIG. 2) with respect to the distance measurement target point on the object.

FIG. 3 is a flowchart showing an example of the imaging control process and the three-dimensional shape data and texture information generating process in Example 1. The process shown in FIG. 3 is started in a case where the user has operated the operating unit 43 to issue a start instruction, for example. When the process shown in FIG. 3 is started, the control unit 45 activates the camera 1 and the distance measuring sensor 2, and inputs, from the storage unit 44, setting data indicating an assumed path created in accordance with the shape of the object (step S1). In the example shown in FIG. 2, the assumed path indicates that the object is horizontally rotated 10 degrees at a time and 360 degrees in total, for example. The assumed path is created beforehand, and is stored in the storage unit 44.

The control unit 45 then determines a distance measurement target point on the object in accordance with the assumed path indicated by the setting data input in step S1 (step S2). The control unit 45 then drives and adjusts the slider (or moves the slider forward and backward with respect to the distance measurement target point) so that the camera 1 is focused on the partial region including the distance measurement target point determined in step S2 (step S3). If the camera 1 is successfully focused on the partial region including the distance measurement target point as a result of step S3, the process moves on to step S4.

In step S4, the control unit 45 supplies a measurement-ON signal to the distance measuring sensor 2 while the camera 1 is focused on the partial region including the distance measurement target point. By doing so, the control unit 45 causes the distance measuring sensor 2 to measure the distance from the position of the camera 1 to the distance measurement target point, and acquires distance data indicating the distance measured by the distance measuring sensor 2 (and stores the distance data into the RAM). The control unit 45 then supplies a shutter-ON signal to the camera 1. By doing so, the control unit 45 causes the camera 1 to capture an image of the partial region including the distance measurement target point, and acquires the image (two-dimensional image) captured by the camera 1 (step S5).

The control unit 45 then determines whether to end the imaging, in accordance with the assumed path indicated by the setting data input in step S1 (step S6). In the example shown in FIG. 2, if the object has horizontally rotated 360 degrees, the control unit 45 determines to end the imaging (step S6: YES), and the process moves on to step S11. In this manner, an image that is equivalent to the circumference of the object and has a predetermined width in the vertical direction is obtained. To acquire an image of the entire surface of the object, the user changes the angle of the object placed on the turntable (or readjusts the position of the object on the turntable), and again operates the operating unit 43 to issue a start instruction so that the process shown in FIG. 3 is started.

On the other hand, if the control unit 45 determines not to end the imaging in step S6 (step S6: NO), on the other hand, the process moves on to step S7. In step S7, the control unit 45 supplies a drive-ON signal to the driving apparatus 3 in accordance with the assumed path indicated by the setting data input in step S1. By doing so, the control unit 45 causes the driving apparatus 3 to drive (or rotate) the turntable so that partial regions of the object are changed (10 degrees in a horizontal direction, for example). As the object rotates in conjunction with the turntable, it is possible to prevent the position of the object from deviating contrary to the intention of the user. The control unit 45 then supplies a measurement-ON signal to the distance measuring sensor 2. By doing so, the control unit 45 causes the distance measuring sensor 2 to measure the distance from the position of the camera 1 to the distance measurement target point included in the changed partial region, and acquires distance data indicating the distance measured by the distance measuring sensor 2 (step S8).

The control unit 45 then determines whether the difference (distance difference) between the distance indicated by the distance data acquired in step S4 and the distance indicated by the distance data acquired in step S8 (that is, in step S8 carried out immediately before the current step) is within a range of a predetermined value in both positive and negative directions (the predetermined value is preferably 0 but set at several mm, with the depth of field being taken into account) (step S9). If the control unit 45 determines the distance difference to be within the range of the predetermined value in the positive and the negative directions (step S9: YES), the process returns to step S5. The control unit 45 then supplies a shutter-ON signal to the camera 1. By doing so, the control unit 45 causes the camera 1 to capture an image of the partial region including the changed distance measurement target point, and acquires the image captured by the camera 1.

If the control unit 45 in step S9 determines the distance difference not to be within the range of the predetermined value in the positive and the negative directions (step S9: NO), on the other hand, the control unit 45 supplies a drive-ON signal to the driving apparatus 3. By doing so, the control unit 45 drives the slider (or moves the slider forward and backward with respect to the distance measurement target point) to eliminate the distance difference (step S10), and the process then returns to step S9. That is, the control unit 45 drives the slider so that the measured distance is kept within the range of the depth of field (which is the above "range of the predetermined value in the positive and the negative directions"). Since the camera 1 is attached to the slider, the distance from the position of the camera 1 to the distance measurement target point can be kept within the range of the depth of field with higher accuracy. In this manner, through the procedures in steps S5 to S10, the partial regions can be sequentially changed while the distance to the distance measurement target point measured by the distance measuring sensor 2 is kept within the range of the depth of field.

In step S11, according to the three-dimensional shape and texture information generating program stored in the storage unit 44, the calculating unit 46 performs the three-dimensional shape data and texture information generating process to generate three-dimensional shape data of and texture information about the object in accordance with the image (two-dimensional image) acquired in the above described manner.

EXAMPLE 2

Figure 4:
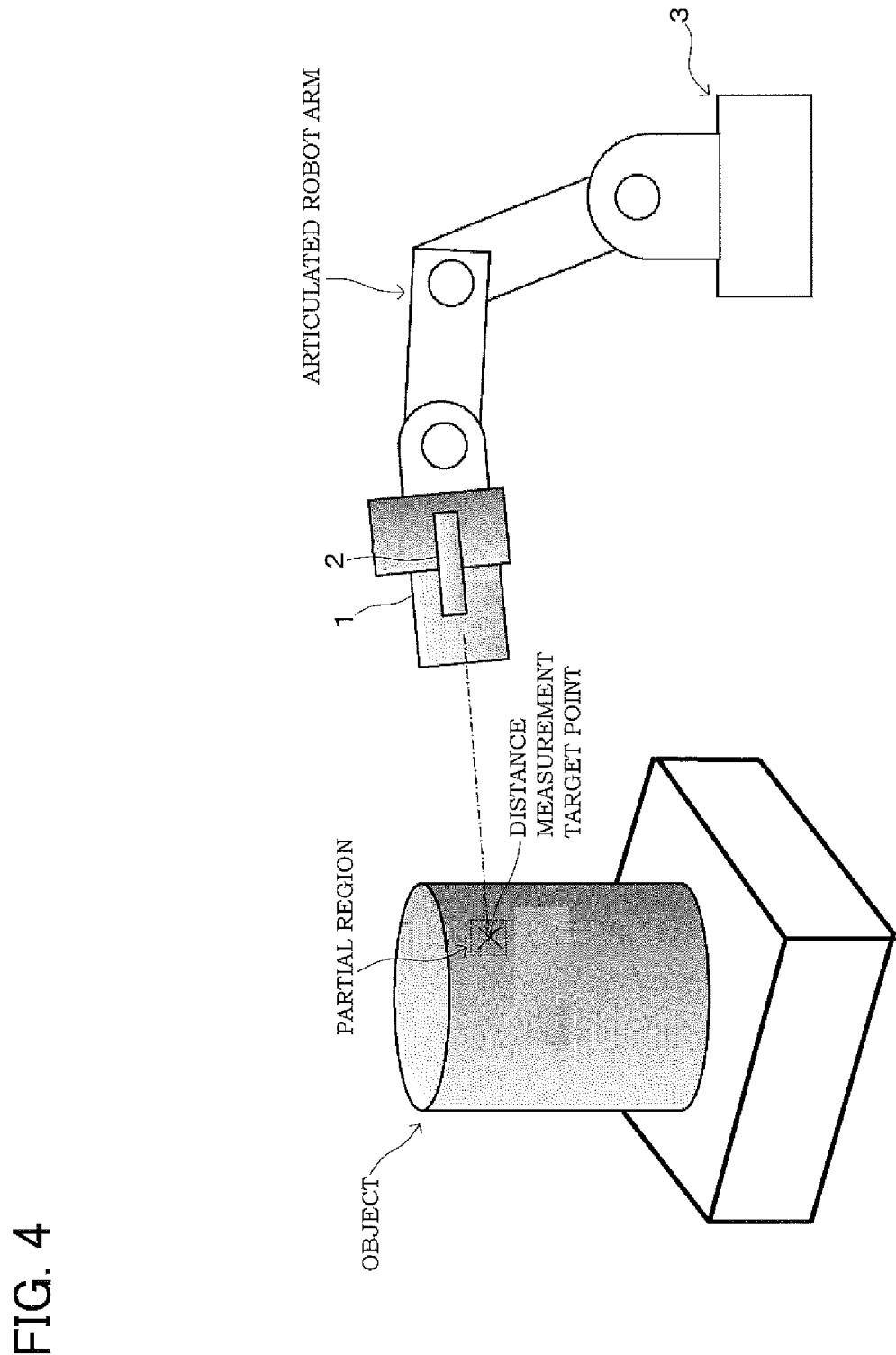
FIG. 4 is a figure showing an example of the positional relationship among an object placed on a base, a camera 1, and a distance measuring sensor 2 in Example 2.
Figure 5:
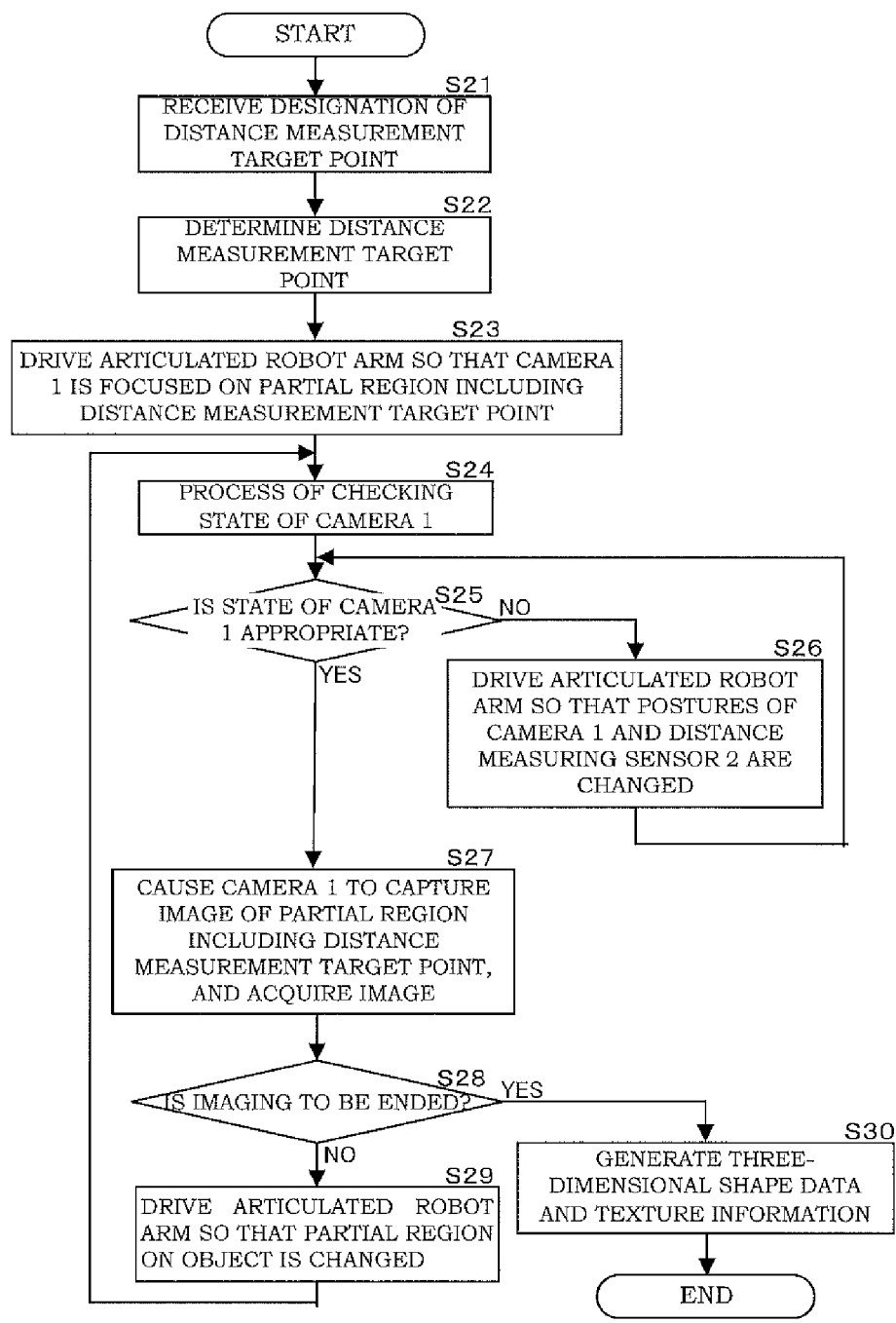
FIG. 5 is a flowchart showing an example of an imaging control process and a three-dimensional shape data and texture information generating process in Example 2.

Referring now to FIGS. 4 and 5, Example 2 is described. FIG. 4 is a figure showing an example of the positional relationship among an object placed on a base, the camera 1, and the distance measuring sensor 2 in Example 2. As shown in FIG. 4, the camera 1 and the distance measuring sensor 2 are attached to the tip of an articulated robot arm. The articulated robot arm is formed by connecting arms with joints, and is driven under the control of the control unit 45. That is, the angles (the rotation angles and the bending angles) of the respective joints of the articulated robot arm are changed by a motor (not shown) driven by the control unit 45. Because of this, the positions and/or the postures of the camera 1 and the distance measuring sensor 2 with respect to the distance measurement target point on the object can be changed.

FIG. 5 is a flowchart showing an example of the imaging control process and the three-dimensional shape data and texture information generating process in Example 2. The process shown in FIG. 5 is started in a case where the user has operated the operating unit 43 to issue a start instruction, for example. When the process shown in FIG. 5 is started, the control unit 45 activates the camera 1 and the distance measuring sensor 2, and the user operates the operating unit 43, so that designation of a distance measurement target point on the object is received (step S21). For example, the display screen of the display unit 42 displays an image appearing on the macro lens (or an image checked through the finder). The user operates the mouse to click the icon at the position corresponding to the distance measurement target point with the mouse, so that the designation of the distance measurement target point is received.

Further, in step S21, setting data indicating an assumed path created in accordance with the shape of the object may be input, as in Example 1. In this case, from the distance measurement target point designated by the user, the articulated robot arm is driven in accordance with the assumed path.

The control unit 45 then determines the distance measurement target point designated in step S21 (step S22). The control unit 45 then drives the articulated robot arm so that the camera 1 is focused on the partial region including the distance measurement target point determined in step S22 (step S23). If the camera 1 is successfully focused on the partial region including the distance measurement target point as a result of step S23, the process moves on to step S24.

In step S24, the control unit 45 performs a process of checking the state of the camera 1 with respect to the distance measurement target point, while the camera 1 is focused on the partial region including the distance measurement target point. In this state checking process, the control unit 45 causes the distance measuring sensor 2 to measure the distance from the position of the camera 1 to the distance measurement target point, acquires distance data indicating the distance measured by the distance measuring sensor 2, and further acquires a normal vector from the distance measurement target point.

The control unit 45 then determines whether the state of the camera 1 is appropriate (step S25). For example, a check is made to determine whether the normal vector from the distance measurement target point and the optical axis of the camera 1 coincide with each other. If the normal vector and the optical axis coincide with each other, the state of the camera 1 is determined to be appropriate. If the control unit 45 determines the state of the camera 1 to be appropriate (step S25: YES), the process moves on to step S27. If the control unit 45 determines the state of the camera 1 not to be appropriate (step S25: NO), on the other hand, the process moves on to step S26.

In step S26, the control unit 45 supplies a drive-ON signal to the driving apparatus 3. By doing so, the control unit 45 causes the driving apparatus 3 to drive the articulated robot arm to change the postures (orientations) of the camera 1 and the distance measuring sensor 2. The process then returns to step S25, and a check is again made to determine whether the state of the camera 1 is appropriate. Through this process, the normal vector and the optical axis of the camera 1 are coincide with each other.

In step S27, the control unit 45 supplies a shutter-ON signal to the camera 1. By doing so, the control unit 45 causes the camera 1 to capture an image of the partial region including the distance measurement target point, and acquires the image captured by the camera 1. The control unit 45 then determines whether to end the imaging (step S28). For example, in a case where the user has operated the operating unit 43 to issue an end instruction, the control unit 45 determines to end the imaging (step S28: YES), and the process moves on to step S30.

On the other hand, if the control unit 45 determines not to end the imaging (step S28: NO), on the other hand, the process moves on to step S29. In step S29, the control unit 45 supplies a drive-ON signal to the driving apparatus 3 in response to an instruction from the user via the operating unit 43 (or in accordance with the assumed path), for example. By doing so, the control unit 45 causes the driving apparatus 3 to drive the articulated robot arm so that the partial region on the object is changed. The process then returns to step S24.

After the process returns to step S24, the control unit 45 causes the distance measuring sensor 2 to measure the distance from the position of the camera 1 to the distance measurement target point in the state checking process, acquires distance data indicating the distance measured by the distance measuring sensor 2, and further acquires a normal vector from the distance measurement target point.

A check is then made to determine whether the state of the camera 1 is appropriate (step S25). In this process (that is, the second-time and subsequent processes), the difference (distance difference) between the distance indicated by the distance data acquired this time and the distance indicated by the previously acquired distance data is within a range of a predetermined value in both positive and negative directions, and if the normal vector from the distance measurement target point and the optical axis of the camera 1 coincide with each other, the state of the camera 1 is determined to be appropriate, and the process moves on to step S27.

If the difference (distance difference) between the distance indicated by the distance data acquired this time and the distance indicated by the previously acquired distance data is not within the range of the predetermined value in both positive and negative directions, or if the normal vector from the distance measurement target point and the optical axis of the camera 1 do not coincide with each other, the process moves on to step S26. Through such a process, the partial regions can be sequentially changed while the distance to the distance measurement target point measured by the distance measuring sensor 2 is kept within the range of the depth of field. That is, the control unit 45 drives the articulated robot arm so that the partial regions are sequentially changed while the measured distance is kept within the range of the depth of field. Since the camera 1 and the distance measuring sensor 2 are attached to the robot arm, the positions and the postures of the camera 1 and the distance measuring sensor 2 can be freely adjusted, and the distance from the position of the camera 1 in an object-secured state to the distance measurement target point can be kept within the range of the depth of field with higher accuracy.

In step S30, according to the three-dimensional shape and texture information generating program stored in the storage unit 44, the calculating unit 46 performs the three-dimensional shape data and texture information generating process to generate three-dimensional shape data of and texture information about the object in accordance with the image (two-dimensional image) acquired in the above described manner.

In Example 2, the articulated robot arm is used. In another example, however, a turntable and a single joint robot arm may be used instead of the articulated robot arm. In this case, the object is set on the turntable, and the camera 1 and the distance measuring sensor 2 are attached to the tip of the single joint robot arm. The control unit 45 then drives the slider and the single joint robot arm so that the partial regions are sequentially changed while the measured distance is kept within the range of the depth of field as described above.

As described so far, according to the above described embodiment, the three-dimensional shape data and texture information generating apparatus 4 causes the distance measuring sensor 2 to measure the distance from the position of the camera 1 to the distance measurement target point while the camera 1 is focused on the partial region including the distance measurement target point on the object, causes the driving apparatus 3 to drive at least the object and/or the camera 1 so that the partial regions are sequentially changed while the measured distance or the distance calculated from the measured distance is kept within the range of the depth of field, acquires images of the respective partial regions on the object by causing the camera 1 to capture the images of the respective partial regions, and generates three-dimensional shape data of and texture information about the object in accordance with the acquired images. Thus, it is possible to reduce appearance of blurring and generation of noise due to the conditions for imaging the object, and obtain high-definition three-dimensional shape data and texture information. As three-dimensional shape data and texture information are simultaneously generated from images captured by a single imaging device, the three-dimensional shape data and the texture information can be generated, with the positions of the three-dimensional shape and the texture information coinciding with each other.

Further, according to the above embodiment, it is possible for the user to obtain a high-quality image simply by setting rough imaging conditions such as the position and the orientation of the camera 1. The user can set an appropriate position and an appropriate orientation prior to imaging simply by moving the camera 1 to the position or the direction in which the object is to be imaged, without any change in the focus position. Accordingly, in texture imaging using a single-lens reflex camera, a texture image of the entire circumference of the shape can be captured with lens-calibrated parameters while the camera is kept in focus. Also, according to the above embodiment, even an object that is placed at a position deviated from the rotation center by several millimeters or more is always imaged from the same distance, and the texture of a region having its center at the point of intersection between the object and the optical axis can be imaged with focus. Further, according to the above embodiment, when the user designates a partial region to be imaged beforehand or with respect to a dynamically generated shape, the distance is made constant, and the imaging position and posture in which the overlapping areas between partial regions are constant are calculated. The camera 1 is then moved, and imaging is performed. As the overlapping areas between the partial regions are made constant, it is possible to acquire stable quality images of the entire circumference of the shape of the object. For general texture, it is preferable to perform imaging from the normal direction of the shape. However, in the case of a high-gloss material, the position and the direction suitable for imaging are different, and therefore, it is difficult to manually prepare an imaging environment. According to the above embodiment, on the other hand, an environment suitable for imaging including lighting is automatically established, and accordingly, it becomes possible to capture a group of images of stable quality.

REFERENCE SIGNS LIST

1 Camera
2 Distance measuring sensor
3 Driving apparatus
4 Three-dimensional shape data and texture information generating apparatus
41a to 41c Interface unit
42 Display unit 43 Operating unit
44 Storage unit
45 Control unit
46 Calculating unit
S Three-dimensional shape data and texture information generating system

The invention claimed is:

1. A three-dimensional shape data and texture information generating system comprising:
an imaging means that captures an image of each partial region on an object;
a distance measuring means that measures a distance from a position of the imaging means to a distance measurement target point;
a driving means that drives at least one of the object and the imaging means;
a control means that controls the imaging means, the distance measuring means, and the driving means; and
a generating means that generates three-dimensional shape data of and texture information about the object in accordance with the image of each partial region captured by the imaging means,
wherein the control means
causes, in the state that the imaging means is focused on the partial region comprising the distance measurement target point on the object, the distance measuring means to measure the distance from the position of the imaging means to the distance measurement target point,
causes the driving means to drive at least one of the object and the imaging means so that the partial regions are sequentially changed while one of the measured distance and a distance calculated from the measured distance is kept within a range of a depth of field, and
acquires an image of each partial region by causing the imaging means to capture the image of each of the partial regions on the object.

2. The three-dimensional shape data and texture information generating system according to claim 1, wherein, while keeping the distance within the range of the depth of field, the control means causes the driving means to drive at least one of the object and the imaging means so that the partial region to be changed and a partial region adjacent to the partial region to be changed overlap each other.

3. The three-dimensional shape data and texture information generating system according to claim 2, wherein the control means causes the driving means to drive at least one of the object and the imaging means so that the same portion of the object is imaged a plurality of times.

4. The three-dimensional shape data and texture information generating system according to claim 3, wherein
the driving means includes a turntable on which the object is placed, and
the control means drives the turntable so that the partial regions are sequentially changed.

5. The three-dimensional shape data and texture information generating system according to claim 3, wherein
the imaging means and the distance measuring means are attached to a slider capable of changing a distance from the distance measurement target point, and
the control means drives the slider so that the measured distance is kept within the range of the depth of field.

6. The three-dimensional shape data and texture information generating system according to claim 3, wherein
the imaging means and the distance measuring means are attached to a robot arm capable of changing at least one of a position and a posture of each of the imaging means and the distance measuring means with respect to the distance measurement target point, and
the control means drives the robot arm so that the partial regions are sequentially changed while one of the measured distance and the distance calculated from the measured distance is kept within the range of the depth of field.

7. The three-dimensional shape data and texture information generating system according to claim 3, wherein a lens of the imaging means is a macro lens.

8. The three-dimensional shape data and texture information generating system according to claim 2, wherein
the driving means includes a turntable on which the object is placed, and
the control means drives the turntable so that the partial regions are sequentially changed.

9. The three-dimensional shape data and texture information generating system according to claim 2, wherein
the imaging means and the distance measuring means are attached to a slider capable of changing a distance from the distance measurement target point, and
the control means drives the slider so that the measured distance is kept within the range of the depth of field.

10. The three-dimensional shape data and texture information generating system according to claim 2, wherein
the imaging means and the distance measuring means are attached to a robot arm capable of changing at least one of a position and a posture of each of the imaging means and the distance measuring means with respect to the distance measurement target point, and
the control means drives the robot arm so that the partial regions are sequentially changed while one of the measured distance and the distance calculated from the measured distance is kept within the range of the depth of field.

11. The three-dimensional shape data and texture information generating system according to claim 2, wherein a lens of the imaging means is a macro lens.

12. The three-dimensional shape data and texture information generating system according to claim 1, wherein
the driving means includes a turntable on which the object is placed, and
the control means drives the turntable so that the partial regions are sequentially changed.

13. The three-dimensional shape data and texture information generating system according to claim 12, wherein
the imaging means and the distance measuring means are attached to a slider capable of changing a distance from the distance measurement target point, and
the control means drives the slider so that the measured distance is kept within the range of the depth of field.

14. The three-dimensional shape data and texture information generating system according to claim 12, wherein a lens of the imaging means is a macro lens.

15. The three-dimensional shape data and texture information generating system according to claim 1, wherein
the imaging means and the distance measuring means are attached to a slider capable of changing a distance from the distance measurement target point, and
the control means drives the slider so that the measured distance is kept within the range of the depth of field.

16. The three-dimensional shape data and texture information generating system according to claim 1, wherein
the imaging means and the distance measuring means are attached to a robot arm capable of changing at least one of a position and a posture of each of the imaging means and the distance measuring means with respect to the distance measurement target point, and the control means drives the robot arm so that the partial regions are sequentially changed while one of the measured distance and the distance calculated from the measured distance is kept within the range of the depth of field.

17. The three-dimensional shape data and texture information generating system according to claim 1, wherein a lens of the imaging means is a macro lens.

18. A three-dimensional shape data and texture information generating system comprising:

a camera that captures an image of each partial region on an object;

a distance measuring sensor that measures a distance from a position of the camera to a distance measurement target point;

a driving device that drives at least one of the object and the camera; and a controller that controls the camera, the distance measuring sensor, and the driving device, wherein the controller causes, in the state that the camera is focused on the partial region comprising the distance measurement target point on the object, the distance measuring sensor to measure the distance from the position of the camera to the distance measurement target point, causes the driving device to drive at least one of the object and the camera so that the partial regions are sequentially changed while one of the measured distance and a distance calculated from the measured distance is kept within a range of a depth of field, and causes the camera to capture an image of each partial region on the object, and the three-dimensional shape data and texture information generating system further comprises a processor that performs a generating process to generate three-dimensional shape data of and texture information about the object in accordance with the image of each partial region captured by the camera.

19. An imaging control program to be executed by a computer included in a control means in a three-dimensional shape data and texture information generating system that includes: an imaging means that captures an image of each partial region on an object; a distance measuring means that measures a distance from a position of the imaging means to a distance measurement target point; a driving means that drives at least one of the object and the imaging means; a control means that controls the imaging means, the distance measuring means, and the driving means; and a generating means that generates three-dimensional shape data of and texture information about the object in accordance with the image of each partial region captured by the imaging means, the imaging control program, stored on a non-transitory computer-readable medium, causing the computer to carry out:

a step of causing, in the state that the imaging means is focused on the partial region comprising the distance measurement target point on the object, the distance measuring means to measure the distance from the position of the imaging means to the distance measurement target point;

a step of causing the driving means to drive at least one of the object and the imaging means so that the partial regions are sequentially changed while one of the measured distance and a distance calculated from the measured distance is kept within a range of a depth of field; and a step of acquiring an image of each partial region by causing the imaging means to capture the image of each of the partial regions on the object.

20. A three-dimensional shape data and texture information generating method comprising:

a step of causing, in the state that a camera is focused on a partial region comprising a distance measurement target point on an object, a distance measuring sensor to measure a distance from a position of the camera to the distance measurement target point on the object;

a step of causing a driving device to drive at least one of the object and the camera so that partial regions are sequentially changed while one of the measured distance and a distance calculated from the measured distance is kept within a range of a depth of field;

a step of causing the camera to capture an image of each partial region on the object in a process in which the partial regions are sequentially changed; and a step of causing a processor to generate three-dimensional shape data of and texture information about the object in accordance with the image of each partial region captured by the camera.

* * * * *